(12) United States Patent
Benner et al.

(10) Patent No.: US 7,584,658 B2
(45) Date of Patent: Sep. 8, 2009

(54) LEVEL TRANSMITTER

(75) Inventors: Hans-Guenter Benner, Kriftel (DE); Bernd Pauer, Eppstein (DE)

(73) Assignee: Siemens Aktiengesellschaft, Munich (DE)

( * ) Notice: Subject to any disclaimer, the term of this patent is extended or adjusted under 35 U.S.C. 154(b) by 280 days.

(21) Appl. No.: 11/527,290

(22) Filed: Sep. 26, 2006

(65) Prior Publication Data

US 2007/0074568 A1    Apr. 5, 2007

(30) Foreign Application Priority Data

Sep. 30, 2005    (DE) .................. 10 2005 047 544

(51) Int. Cl.
*G01F 23/32* (2006.01)
(52) U.S. Cl. .................. 73/317; 73/305
(58) Field of Classification Search .......... 73/305, 73/313, 317
See application file for complete search history.

(56) References Cited

U.S. PATENT DOCUMENTS

| 4,532,491 A | * | 7/1985 | Rau et al. ............... 338/33 |
| 4,924,704 A | * | 5/1990 | Gaston .................... 73/317 |
| 5,341,679 A | * | 8/1994 | Walkowski et al. ........ 73/317 |
| 5,426,271 A | * | 6/1995 | Clark et al. ............. 200/84 C |
| 5,746,088 A | * | 5/1998 | Sawert et al. ............ 73/317 |
| 6,209,392 B1 | * | 4/2001 | Rapala .................. 73/317 |
| 6,658,934 B1 | * | 12/2003 | Housey et al. ............ 73/317 |
| 6,868,724 B2 | * | 3/2005 | Brzozowski et al. ....... 73/317 |
| 7,377,163 B2 | * | 5/2008 | Miyagawa ................ 73/317 |
| 7,437,929 B2 | * | 10/2008 | Koide et al. ............. 73/313 |
| 2004/0011129 A1 | * | 1/2004 | Gilmour et al. .......... 73/313 |
| 2005/0122693 A1 | | 6/2005 | Gilmour et al. |
| 2005/0139003 A1 | * | 6/2005 | Cochran et al. .......... 73/313 |

FOREIGN PATENT DOCUMENTS

DE    10 2004 002 461 A1    8/2005
WO    WO 2004106867 A1 *    12/2004

* cited by examiner

*Primary Examiner*—Hezron Williams
*Assistant Examiner*—Rodney T Frank
(74) *Attorney, Agent, or Firm*—Cohen Pontani Lieberman & Pavane LLP

(57) ABSTRACT

The invention relates to a level transmitter, having a lever arm which carries a float at one end and is received by a bracket at its other end, a support made of synthetic material, a bearing arranged on the support for the brackets and/or the lever arm, a level sensor arranged on the support and comprising a cover and a substrate, a resistor network arranged on this substrate and associated with a contact structure, with the electrical connection of the contact structure generating, with the resistor network and as a function of the pivotal position of a lever arm, an electrical signal indicating the level, and having at least one permanent magnet for actuating the contact structure. The bracket is made of an electrically conductive synthetic material and, at least in the region between the bearing and the cover, the support is made of an electrically conductive synthetic material.

8 Claims, 2 Drawing Sheets

LEVEL TRANSMITTER

BACKGROUND OF THE INVENTION

The invention relates to a level transmitter, having a lever arm carrying a float, a support made of synthetic material, a bearing arranged on the support for the lever arm, a level sensor arranged on the support and comprising a cover and a substrate, a resistor network arranged on this substrate and associated with a contact structure, with the electrical connection of the contact structure generating, with the resistor network and as a function of the pivotal position of a lever arm, an electrical signal indicating the level, and having at least one permanent magnet for actuating the contact structure. Level transmitters are often used in fuel tanks together with feeding devices.

Level transmitters of the type mentioned at the outset have long been part of the prior art and are thus known. Because of increasing safety requirements, level transmitters in fuel tanks also have increasingly to be protected from excessively high electrostatic charges. Electrostatic charges in a lever-type transmitter may occur at the lever arm, as a result of moving through the fuel. Because the support and, if present, the bearing of the lever arm are made of synthetic material, the charges of the lever arm cannot be led away. In closed systems, there is no electrically conductive connection between the lever arm and the resistor network, or the grounding line leading to the resistor network, which could be used to discharge electrostatic charges.

It is the object of the invention to provide a level transmitter which is sufficiently protected from electrostatic charges. Protection from electrostatic charges should in this case be provided as inexpensively as possible.

BRIEF DESCRIPTION OF THE INVENTION

The object is achieved according to the invention in that the bracket is made of an electrically conductive synthetic material and, at least in the region between the bearing and the cover, the support is made of an electrically conductive synthetic material.

Making the bracket and at least a region of the support of electrically conductive synthetic material has the effect of leading electrostatic charges at the lever arm to the cover, from which they are safely led away through the contact made by the level sensor. The risk of uncontrolled flashover in the fuel tank is thus eliminated. Additional components for discharging the electrostatic charges are not required.

The level transmitter is of a particularly simple construction if the conductive synthetic material in the region between the bearing and the cover is electrically conductive polyoxymethylene. With this construction, the same basic material can be used for the electrically conductive region as for the rest of the support. This means that there is no need to provide a further material for manufacturing the support. This makes the support particularly inexpensive.

Electrically conductive polyoxymethylene is obtained in that the polyoxymethylene contains admixed graphite. Graphite as an admixed material is distinguished in that it is easy to admix and in that polyoxymethylene modified in this way is just as easy to process.

In another embodiment, polyoxymethylene is made electrically conductive by admixing powdered metal.

Because the support only has to be electrically conductive in the region between the bearing and the cover, it has proven advantageous to form the electrically conductive polyoxymethylene in this region of the support as a separate component which is materially or form-fittingly connected to the rest of the support. The separate component made of electrically conductive polyoxymethylene can thus be manufactured independently of the rest of the support. Subsequent assembly involves relatively little complexity. In this arrangement, a material connection may be made by adhesion or welding. For a form-fitting connection, latching and push-in connections have proven useful.

Assembly of an additional component made of electrically conductive polyoxymethylene is dispensed with if the support is made in one piece as a two-component injection molded part. In this arrangement, the support is injection molded in one working step, with both polyoxymethylene and electrically conductive polyoxymethylene being supplied to the locations provided for it in the mold at the same time, and the two materials being connected to one another during the injection molding to give a one-piece support.

Constructing the support with two materials is dispensed with, according to a further embodiment, if the support is made entirely of electrically conductive polyoxymethylene.

BRIEF DESCRIPTION OF THE DRAWINGS

The invention will be explained in more detail by way of an exemplary embodiment. In the drawings.

DETAILED DESCRIPTION OF THE INVENTION

Figure 1:
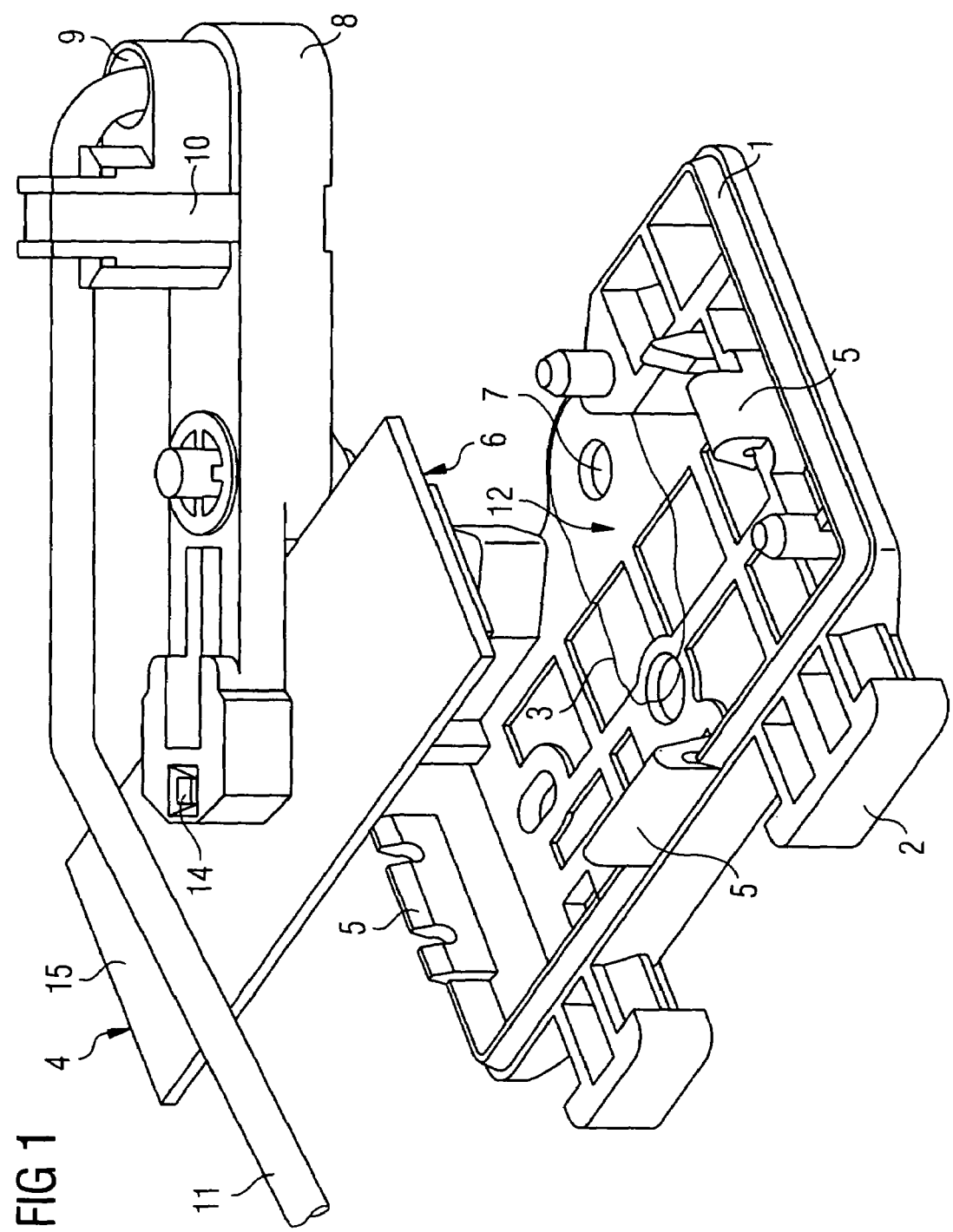
FIG. 1 shows a level transmitter according to the invention.

The level transmitter in FIG. 1 comprises a support 1 made of polyoxymethylene. Shaped means 2 on the side serve to secure the support in a fuel tank. The support 1 has a central recess 3 into which the level sensor 4 is inserted. The level sensor 4 is held against the support 1 by means of latching elements 5.

The level sensor 4 comprises a substrate 15 on the underside of which a resistor network is mounted and a contact structure is arranged. To protect the resistor network and the contact structure, the substrate is covered with a metal cover 6.

The support 1 furthermore has a bearing which is constructed as a bore 7 and in which a peg of a bracket 8 engages, with the result that the bracket 8 is borne rotatably in the support 1. The bracket 8 is made of an electrically conductive polyoxymethylene, with the electrical conductivity of the polyoxymethylene being achieved by admixing graphite. The bracket 8 has a bore 9 and latching elements 10, by means of which a lever arm 11 is arranged firmly on the bracket 8. Arranged on the free end (not illustrated) of the lever arm 11 is a float (also not illustrated). If the level changes, the float moves, and this pivots the lever arm 11 and with it the bracket 8 by way of the level sensor 4. At this, a permanent magnet 14 arranged on the bracket 8 actuates the contact structure, which generates a signal indicating the level. The support 1 furthermore has a region 12 made of an electrically conductive polyoxymethylene. This region 12 extends from the bore 7 to the recess 3. This region 12 connects the bracket 8 electrically conductively to the cover 6 of the level sensor 4, with the result that electrostatic charges occurring at the lever arm 11 can flow away to the cover 6. To manufacture the support 1, a two-component injection molding process is used. In this process, polyoxymethylene is injected into the mold at a plurality of locations at the same time, with electrically conductive polyoxymethylene being injected at the location of the region 12. The two polyoxymethylenes are connected while still in the mold, with the result that the region 12 is materially connected to the support 1.

Figure 2:
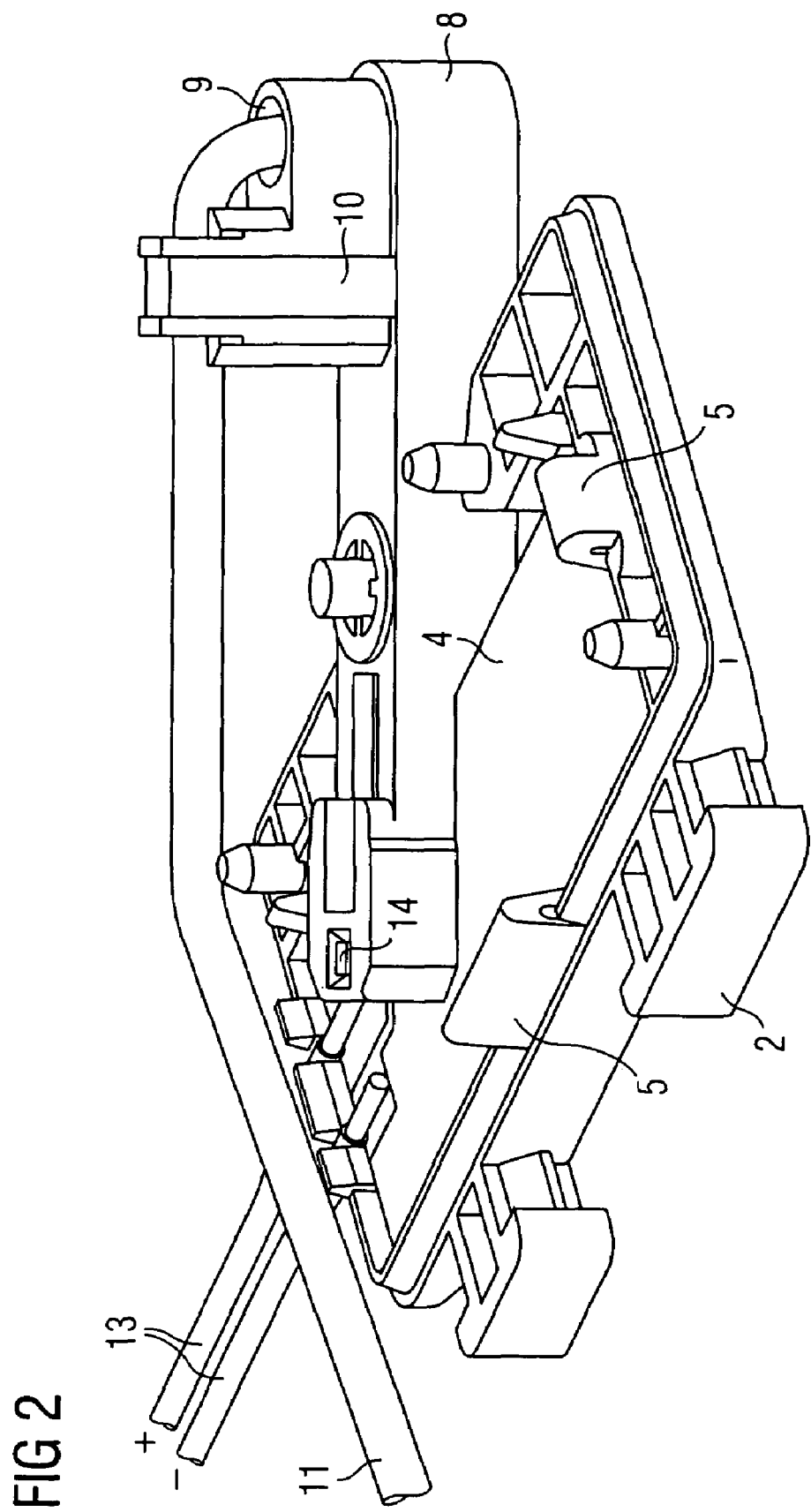
FIG. 2 shows the level transmitter from FIG. 1 in the assembled condition.

FIG. 2 shows the finished level transmitter. The level sensor 4 is inserted into the central recess and is held in this position by the latching elements 5. The level sensor 4 makes contact through connection lines 13, with the electrostatic charges also being led away through the connection lines 13.

The invention claimed is:

1. A level transmitter, comprising:
    a lever arm which carries a float at one end and is received by a bracket at its other end;
    a support made of synthetic material;
    a bearing arranged on the support for supporting at least one of the bracket and the lever arm;
    a level sensor arranged on the support and comprising a cover and a substrate;
    a resistor network arranged on the substrate and associated with a contact structure, with an electrical connection of the contact structure generating, with the resistor network and as a function of a pivotal position of the lever arm, an electrical signal indicating the level; and
    at least one permanent magnet for actuating the contact structure;
    wherein the bracket is made of an electrically conductive synthetic material and, at least in a region between the bearing and the cover, the support is made of an electrically conductive synthetic material.

2. The level transmitter as claimed in claim 1, wherein the electrically conductive synthetic material in the region between the bearing and the cover is electrically conductive polyoxymethylene.

3. The level transmitter as claimed in claim 2, wherein the polyoxymethylene contains graphite, at least in the region between the bearing and the cover.

4. The level transmitter as claimed in claim 2, wherein the polyoxymethylene contains powdered metal, at least in the region between the bearing and the cover.

5. The level transmitter as claimed in claim 1, wherein the electrically conductive synthetic material of the support is formed as a separate component which is materially or form-fittingly connected to a remainder of the support.

6. The level transmitter as claimed in claim 1, wherein the support is made in one piece.

7. The level transmitter as claimed in claim 1, wherein the support is made entirely of electrically conductive polyoxymethylene.

8. The level transmitter as claimed in claim 6, wherein the support is a two-component injection molded part.

* * * * *